Aug. 21, 1951 L. F. FALKENSTEIN 2,565,213

COURSE OR CONDITION MAINTAINING MECHANISM

Filed Feb. 8, 1947

INVENTOR.
Louis F. Falkenstein
BY
Martin J. Finnegan
ATTORNEY

Patented Aug. 21, 1951

2,565,213

UNITED STATES PATENT OFFICE 2,565,213

COURSE OR CONDITION MAINTAINING MECHANISM

Louis F. Falkenstein, Dedham, Mass.

Application February 8, 1947, Serial No. 727,378

4 Claims. (Cl. 318—28)

This invention relates to orientation, and particularly to the automatic maintenance of a selected course or condition.

An object of the invention is to provide a novel electronic control system for the maintenance of a selected course or condition.

Another object is to provide novel photo-electric means for controlling the energization of a power mechanism, which power mechanism may be a rudder or other steering gear, or it may be any other device for performing a restoring operation upon an object whose deviation from normal condition can be indicated by said photo-electric means.

Either the novel photo-electric means or the novel electronic means disclosed herein may be employed in an automatic course or condition maintaining system, independently of the other; but in the embodiment of the invention illustrated the said two means are combined to form a single system of control including all the features, which distinguish the present invention from prior devices in the art. Among these are:

1. The use of light polarizing elements in a novel inter-relationship to govern the operation of the photo-electric circuits.

2. The use of novel circuit arrangements for converting any photo-electric unbalance into a modulated and amplified power applying force for controlling of the restoring motor.

3. The use of novel voltage controlling circuits for regulating the restoring action, both as to the time of initiation thereof and as to the ratio between restoring rate and the follow-up action which determines the length of the restoring cycle.

Other objects and features of the invention will be apparent upon reading of the following description of the preferred embodiment illustrated in the accompanying drawings, wherein.

Figures 1, 2, 3, 4, 5:
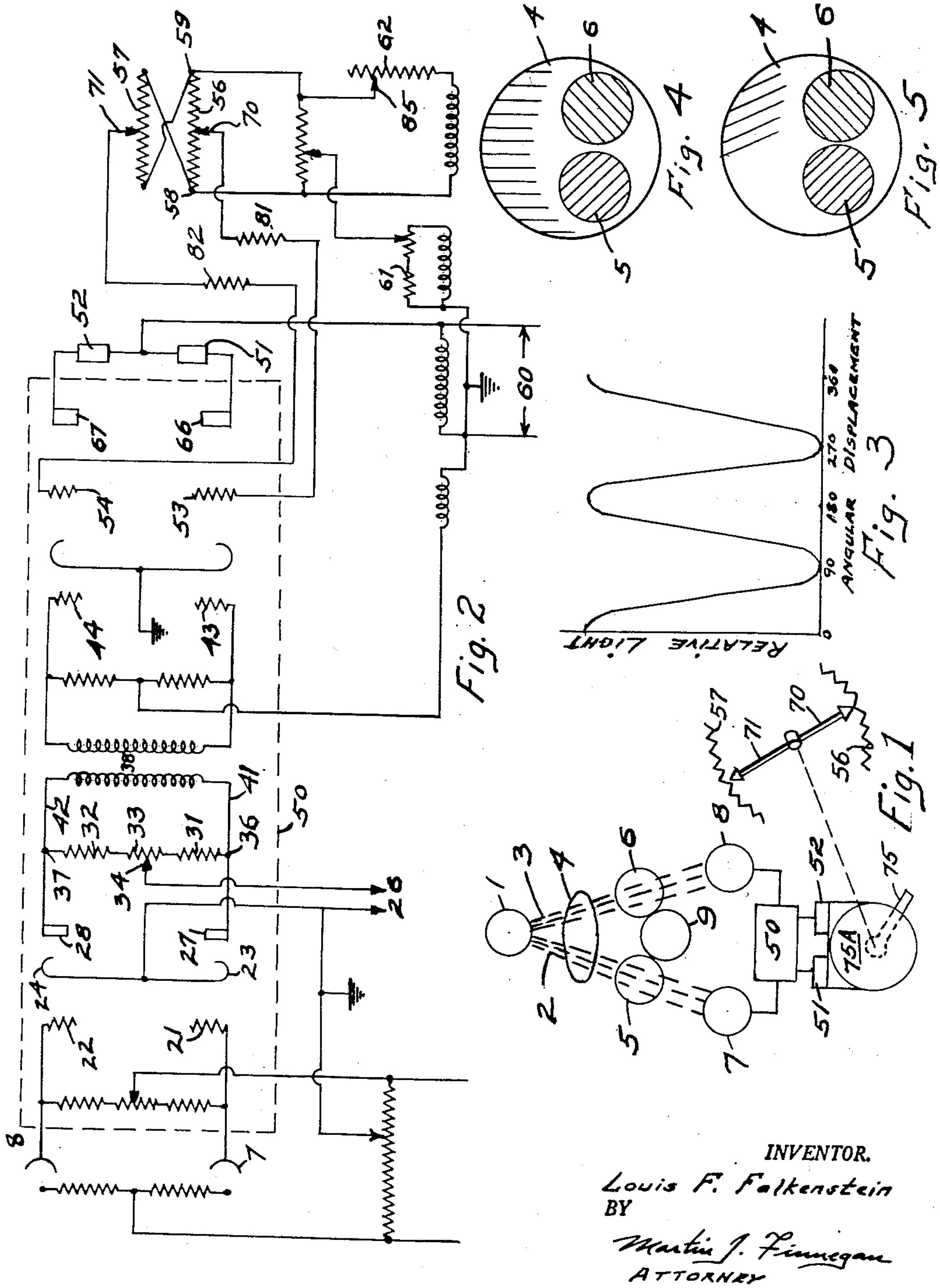
Fig. 1 is a schematic lay-out of the system, indicating the major component parts.
Fig. 2 shows the complete circuit details.

Fig. 3 is a curve showing the light variation throughout the range of possible course deviations; and Figures 4 and 5 are diagrams indicating the varying relationship of disks 5 and 6 to disk 4 under varying conditions.

Referring to both Figures 1 and 2, wherein like characters designate corresponding parts, a light source 1 supplies light to a pair of photo-electric cells 7, 8 by way of interposed disks 4, 5 and 6; the disk 4 being large enough to encompass the total area of disks 5 and 6, and the latter being spaced apart, so that the light ray paths 2, 3 diverge and strike the correspondingly spaced cells 7, 8 respectively.

All three disks 4, 5, 6 are of light polarizing material, but the axis of polarization of disk 5 is ninety degrees divergent from the axis of polarization of disk 6, and the axis of polarization of disk 4 is midway between said first-named axes when the body to be controlled is pursuing a normal, pre-selected course or condition. Upon deviation of the said body from normal course or condition, the disk 4 will rotate responsively to said deviation, that is, the direction and degree of rotary motion will depend upon the direction and degree of deviation. Disks 5 and 6, on the other hand, will remain in fixed positions relative to each other, there being an idler gear 9 (or equivalent coupling means) inter-connecting therewith. Such a coupling permits initial setting of the disks 5, 6 by identical simultaneous adjustment of both to the desired course to be steered.

When the disk 4 is in its normal, mid-position the amount of light passing through disk 5 is equal to the light passing through disk 6, hence cells 7 and 8 operate to maintain equal potential at the control grids 21, 22, respectively, of the amplifier such as a twin triode tube having cathodes 23, 24 supplied from a source 26 of alternating current. This may conveniently be a standard 60 cycle, 115 volt source, or it may of course be of any other frequency or potential within practical limits.

To the plate circuits 27, 28 of the double triode I connect equal resistors 31, 32, joined by a balancing resistor 33 whose shiftable tap 34 is connected directly back to the source 26. With anodes 27, 28 properly balanced (by adjustment of tap 34) there will be no potential difference between points 36 and 37—hence no output current at transformer 38—so long as grids 21, 22 are receiving equi-potential impulses from cells 7, 8, respectively; but upon shifting of the disk 4 and resultant increase of light to one of the cells, with corresponding decrease to the other, the plate balance is upset and modulated current will flow through transformer circuit 41, 42, in a direction dependent upon the direction of rotation of disk 4. A corresponding unbalance will occur at the thyratron control grids 43, 44, causing current to flow to the actuating element 51 or 52 for producing the power application required to restore the body (ship, aircraft, or other device) to its selected course or condition; the direction of power application depending upon which of the units 51, 52 is energized, and this in turn depending upon the direction of flow in circuit 41, 42. By way of example, elements 51 and 52 may be electrically operated valves controlling flow of actuating fluid to and from a fluid motor whose power output shaft is adapted to be rotated by such actuating fluid, in one direction or the other, according to which of the two valves 51, 52 is electrically energized, and at a speed proportional to the intensity of the energy flow in the control circuit. Moved with, and by, the said motor shaft are, first, a rudder 75 (Fig. 1) or other course directing agency; and secondly, a follow-up mechanism (Fig. 2) having arms 70, 71 adapted to vary the electrical effect of resistance units 56, 57 in such manner as to restore the electrical balance of the thyratron circuits, in an appropriate time interval corresponding to the interval required for the rudder 75 to bring about a return of the vessel to its pre-set course. The electronic action is as follows:

The thyratrons have their shield or auxiliary grids 53, 54 wired to the opposite sides 56, 57, respectively, of the follow-up unit. The said follow-up unit is arranged with its terminals 58, 59 connecting with the instantaneous negative polarity side of source 60 by way of "dead spot" control resistor 61 and ratio control resistor 62. The polarity of the auxiliary grids 53, 54 is opposite to that of the corresponding anodes 66, 67 of the thyratrons, while that of the control grids 43, 44 is the same as that of the corresponding anodes. Under these conditions the firing of the thyratrons can be controlled by the almost linear voltage variation (according to manufacturers tube data) of the auxiliary grid, throughout the operating range of the indicated circuits.

Assuming that the direction of unbalance is such as to cause current flow to unit 51, the resultant shifting of the rudder or other restoring agency 75 (Fig. 1) will move arm 70 of the follow-up device and thus produce a gradual increase in the negative voltage bias on auxiliary grid 53 of thyratron 53—66. This increase will continue until the voltage on this grid will not allow the thyratron to pass any more current to unit 51.

The rudder has now been moved an angle proportional to the number of degrees off course. This rudder will maintain this position until the ship starts to return to the pre-set course. The action then takes place in the opposite direction. That is as disk 4 returns to a balance of light condition on the two cells. The unbalance voltage still on the thyratron control grids is decreased. This allows the opposite thyratron to pass current moving the rudder in the opposite direction bringing it close to amidships position. At the same time the compensating unbalance voltage on the shield grids of the thyratrons is being reduced. Eventually a point is reached wherein the rudder is amidships (ship on course) the disk 4 is positional to balanced light on the two photo cells, and the follow-up voltages on the two thyratron grids are balanced and equal.

If it is desired to vary the degree of "lag" as between occurrence of a deviation and the commencement of the restoring function, as in rough waters, the "dead spot" resistor setting is manually shifted, to change the voltage applied to the auxiliary grids, and hence the point at which electronic flow begins.

If it is desired to vary the degree of lag as between commencement of the restoring function and commencement of the follow-up action, it is only necessary to adjust the "lost motion" mechanical connections between each arm 70, 71 and the body being restored.

If it is desired to vary the ratio between degrees of body movement and degrees of follow-up movement of arms 70, 71, it is only necessary to shift the position of the arm 85 on the ratio control potentiometer 62.

The resistors 81, 82, in series with grids 53, 54, respectively, prevent excessive current flow during the firing period of the respective thyratrons, or on the positive half of each alternating current cycle at any period other than the firing period (including the periods of initial adjustment, or test).

It will be understood that the several A. C.

sources must be held in proper phase relationship, as by use of phase shifters of standard design and arrangement.

From the foregoing explanation it will be apparent that the invention provides novel methods and apparatus for the precise and efficient maintenance of a body in pre-selected relationship to a source or condition to be followed, and for the application of novel light directing means to photo-sensitive elements, as an aid to the operation of such course or condition maintaining means. It will also be apparent that the novel light directing means, as well as the novel electronic controls above described, are capable of uses other than that illustrated, and are likewise capable of use independently of each other, as well as in other interrelationships. The appended claims are to be read in the light of this explanation, are not limited in scope in any other respect not specified therein.

What I claim is:

1. In a control system, a pair of operating circuits for initiation of a work function, said operating circuits including an electronic tube having cathodes, anodes, control grids and auxiliary grids, means normally maintaining said control grids at equal potential to prevent activation of said tube, means responsive to creation of a potential difference at said control grids to initiate the work cycle by way of one of said operating circuits, and means synchronized with said work cycle to continuously vary the potential at said auxiliary grids and thereby control said work cycle; said equal potential maintaining means including an additional electronic tube having cathodes, anodes, and control grids, and balanced photo-electric means connected to said control grids.

2. In a control system, a pair of operating circuits for initiation of a work function, said operating circuits including an electronic tube having cathodes, anodes, control grids and auxiliary grids, means normally maintaining said control grids at equal potential to prevent activation of said tube, means responsive to creation of a potential difference at said control grids to initiate the work cycle by way of one of said operating circuits, and means synchronized with said work cycle to continuously vary the potential at said auxiliary grids and thereby control said work cycle; said equal potential maintaining means including a pair of light sensitive cells, and normally balanced light polarizing means controlling operation of said cells.

3. Apparatus as defined in claim 2, wherein said light polarizing means is unbalanced during said work cycle, and automatically re-balanced at the completion thereof.

4. Apparatus as defined in claim 2, wherein said light polarizing means is initially adjustable to direct the desired amount of light toward said cells.

LOUIS F. FALKENSTEIN.

REFERENCES CITED

The following references are of record in the file of this patent:

UNITED STATES PATENTS

| Number | Name | Date |
|---|---|---|
| 2,167,484 | Berry | July 25, 1939 |
| 2,182,717 | Chance | Dec. 5, 1939 |
| 2,263,497 | Harrison | Nov. 18, 1941 |
| 2,270,991 | Bagno | July 27, 1942 |
| 2,371,415 | Tolson | Mar. 13, 1945 |